(12) United States Patent
Holfter et al.

(10) Patent No.: US 6,660,325 B2
(45) Date of Patent: Dec. 9, 2003

(54) PROCESS FOR THE APPLICATION OF AQUEOUS MULTI-COMPONENT COATING AGENTS

(75) Inventors: Dirk Holfter, Hagen (DE); Birgit Laack, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 145 days.

(21) Appl. No.: 10/032,857

(22) Filed: Dec. 27, 2001

(65) Prior Publication Data

US 2003/0124264 A1 Jul. 3, 2003

(51) Int. Cl.$^7$ ................................................. B05D 5/12
(52) U.S. Cl. ....................................................... 427/121
(58) Field of Search .......................................... 427/421

(56) References Cited

FOREIGN PATENT DOCUMENTS

| EP | 0685544 A | 6/1995 |
|---|---|---|
| WO | WO 01/05860 | 1/2001 |

*Primary Examiner*—Bernard Pianalto
(74) *Attorney, Agent, or Firm*—Sudhir G. Deshmukh

(57) ABSTRACT

A process for the application of aqueous multi-component coating compositions comprising at least two components and are prepared by premixing said components. The mixture is applied to a substrate using high-speed rotary atomization, wherein the high-speed rotary atomizer(s) is operated with a circumferential velocity of the spray edge(s) in the range of 10,000 to 25,000 m/min.

9 Claims, No Drawings

PROCESS FOR THE APPLICATION OF AQUEOUS MULTI-COMPONENT COATING AGENTS

FIELD OF THE INVENTION

The present invention relates to a process for the application of aqueous multi-component coating compositions, particularly aqueous two-component coating compositions.

BACKGROUND OF THE INVENTION

Typically, aqueous multi-component coating compositions are prepared just prior to their application by mixing components that had been previously stored separately from one another. Generally speaking, the components of aqueous multi-component coating compositions are miscible with one another only after a great deal of difficulty, thereby necessitating the use of equipment requiring a high input of energy. The completely mixed aqueous multi-component coating compositions ready for application are aqueous dispersions, wherein binders and/or hardeners form one or more disperse phases in a continuous aqueous phase.

The quality of a coating applied from an aqueous multi-component coating composition, with regard to technological and/or optical properties, depends upon the degree of mixing of the components prior to application. It is generally known that greater homogeneity of such a mixture, for example a finer dispersion, corresponds to an increase in the quality of the coating with regard to properties, such as, appearance, leveling and gloss. In order to achieve good mixing properties, measures had to be taken in terms of the formulation such as, for example, making use of hydrophilized components, however, these measures restrict the developers of aqueous multi-component coating compositions in their freedom to develop a formulation with regard to the components that may be utilized.

Typically, mixing equipment for two-component coatings present in automotive OEM (Original Equipment Manufacturing) coating plants, (e.g. static mixers such as Kenics mixers), do not routinely provide the necessary mixing quality for the application of aqueous multi-component coating compositions.

EP-A-0 685 544 and WO 01/05860 disclose processes, operating on the principle of jet dispersion, for the preparation of aqueous two-component polyurethane coating agents. Both components of the aqueous two-component polyurethane coating agent are pressed through fine nozzles at high pressure and depressurized, wherein the mixing process is characterized by the use of a dynamic mixer, which requires considerable input of energy during mixing. However, these processes have several disadvantages such as, for example, the use of elaborate mixing technology which requires large amounts of space, general preparation work for the jet dispersion devices, and considerable amounts of energy and maintenance in order to operate the jet dispersion devices.

It is a desire within the industry to utilize a process that incorporates the simple and conventional technology of static mixers rather than the elaborate mixing technology of dynamic mixers. Therefore, it is an object of the present invention to provide a process for the application of coatings comprising aqueous multi-component coating compositions, where the process permits a high level of coating quality without the use of elaborate mixing technology such as dynamic mixers (i.e., nozzle jet dispersers) when mixing the components, such that the conventional multi-component mixing installations present in coating plants for industrial-scale production line coating, for example, in automotive production line coating, may be used.

SUMMARY OF THE INVENTION

The present invention relates to a process for the application of aqueous multi-component coating compositions, comprising at least two components, to a substrate. More specifically, the process comprises the steps of:

(a) preparing a premix of an aqueous multi-component coating composition comprising at least two components, preferably two components, and optionally water;

(b) high-speed rotary atomizing the premixture using at least one high-speed rotary atomizer, each having one spray edge, wherein each spray edge has a circumferential velocity ranging from 10,000 to 25,000 m/min; and (c) applying the atomized premixture to a substrate.

DETAILED DESCRIPTION OF THE EMBODIMENTS

The process of the present invention relates to the application of aqueous multi-component coating compositions, and particularly aqueous two-component coating compositions, to a substrate. These coating compositions are prepared, just prior to their application, by premixing a particular ratio of at least two components, which are initially stored separately from one another. The components may be premixed in a ratio determined by the stoichiometry of the cross-linking reaction in order to obtain a suitable aqueous multi-component coating composition. These components, namely a binder and a cross-linking agent, are stored separately from one another in order to prevent a premature cross-linking reaction.

More specifically, the process comprises the steps of:

(a) preparing a premix of an aqueous multi-component coating composition comprising at least two components, preferably two components, and optionally water;

(b) high-speed rotary atomizing the premixture using at least one high-speed rotary atomizer, each having one spray edge, wherein each spray edge has a circumferential velocity ranging from 10,000 to 25,000 m/min; and (c) applying the atomized premixture to a substrate.

The term "premix" as used herein, refers to the ready-to-apply mixture of the components of an aqueous multi-component coating composition with its relatively low degree of homogenization as it is fed into the rotary atomizer (s). The term shall only apply to that mixture which is fed into the rotary atomizer(s) and shall not mean the same mixture after having entered the bell dish of the rotary atomizer(s).

Application of the premix to a substrate is performed using high-speed rotary atomization, preferably electrostatically supported high-speed rotary atomization. In the case of electrostatic support, the aqueous multi-component coating composition may be charged directly by means of the high-speed rotary bell or by external charging. The premixed aqueous multi-component coating compositions may be applied in one or more spray passes to any substrate such as, for example, automobile bodies or body parts. The high-speed rotary atomizer(s) may be passed by means of an automatically controlled machine or a coating robot over the substrate surfaces to be coated.

Examples of high-speed rotary atomizers include conventional rotary bells suitable for the application of liquid coatings and are made of metal, for example, aluminum, titanium or refined steel, wherein the circular spray edges of the atomizers have a diameter of, for example, 5 cm to 12 cm. Examples of such rotary bells include the ECO-M bell (manufactured by DÜRR GmbH, Bietigheim Bissingen, Germany) or the G1 atomizer (manufactured by ABB Flexible Automation, Friedberg, Germany). The spray edges of the rotary bells may be unserrated, but are preferably serrated, and more preferably straight-, cross- or diagonally-serrated.

The circumferential velocity of the spray edge lies in the range of 10,000 to 25,000 m/min. Thus, this means, for example, where the spray edge has a diameter of 6.5 cm, the rotational speed (measured as revolutions per minute) will be in the range from 50,000 to 120,000 $min^{-1}$. In cases where the spray edge diameter is in the lower range of values, the rotational speed tends to lie in the upper range of values and vice versa such as, for example, where the spray edge has a diameter of 5 cm, the rotational speed will be in the range from 65,000 to 156,000 $min^{-1}$. In each case, the 10,000 to 25,000 m/min range for the circumferential velocity of the spray edge is 10% to 150% higher than is used in the art for the rotary atomizing application of aqueous multi-component coating compositions. The greater circumferential velocity of the spray edge according to the present invention provides a coating having a satisfactory appearance, satisfactory leveling properties and a high level of gloss, in spite of the fact that the aqueous multi-component coating compositions have been premixed without making use of elaborate mixing technology such as for example dynamic mixers, as is illustrated in the Examples.

In the present invention the outflow rate of the coating composition lies in the conventional range of 50 to 500 ml/min of the aqueous multi-component coating composition per high-speed rotary atomizer.

Furthermore, it may be advantageous to operate the shaping air normally used in high-speed rotary atomization with large amounts of air of, for example, 100 to 350 l/min per high-speed rotary atomizer.

Without wishing to be bound by theory, the multi-component coating composition premixed without elaborate equipment prior to application and present, in particular, as an aqueous dispersed system and fed to the high-speed rotary atomizer(s) undergoes highly effective homogenization on the bell dish and/or at the spray edge during the actual atomization process and/or during the path to the substrate surface to be coated and/or when contacting the substrate surface, for example, by a process whereby one, several or all the dispersed-form components of the already mixed aqueous multi-component coating composition are dispersed even more finely. It is believed that this is the reason for the good coating results, which may be achieved with the process according to the invention, with regard to both the technological, and in particular, the optical surface quality of the coating obtained.

The application process according to the invention is particularly suitable for the preparation of coatings in the field of automotive OEM coating, for example, the preparation of hydrosurfacer, color- and/or special effect-imparting waterborne base coat or particularly waterborne top coat or waterborne clear coat layers.

The aqueous multi-component base coat compositions are applied having a dry layer thickness of about 10 to 50 $\mu$m wherein the thickness is dependent upon the desired shade (i.e., color shades with small hiding power need a higher thickness and vice versa), as is well known in the art, whereas aqueous multi-component clear coat or top coat compositions are applied having a dry layer thickness of about 30 to 60 $\mu$m. The coating layers applied from the aqueous multi-component coating compositions may be dried or baked at temperatures up to 160° C., and preferably baked at temperatures ranging from 60° C. to 160° C.

In the case of automotive production line coating, for example, an aqueous multi-component base coat layer comprising the aqueous multi-component coating composition applied to a pre-coated automobile body provided with an electrodeposition primer and optionally, a surfacer layer, may be dried or baked after application before being overcoated with a clear coat. Application takes place preferably, however, in the known wet-in-wet process (i.e. after a flash-off phase), at 20° C. to 80° C., the waterborne base coat layer is overcoated with a clear coat in a dry layer thickness of, for example, 30 to 60 $\mu$m, and baked together with said clear coat at temperatures from, for example, 60° C. to 160° C.

The aqueous multi-component coating compositions are used preferably for the preparation of the outer clear coat layer of a multi-layer coating. A waterborne clear coat layer comprising the aqueous multi-component coating composition is applied to a substrate provided with a color- and/or special effect-imparting one-layer or multi-layer pre-coating, and then baked. For example, the waterborne clear coat layer is applied from an aqueous multi-component coating composition in the wet-in-wet process, preferably to a waterborne base coat layer flashed off at, for example, 20° C. to 80° C. and the two coating layers are then baked together. The combined baking of the two coating layers may take place at temperatures from 60° C. to 160° C., and preferably, from 80° C. to 160° C. if, for example, it is used as a baking system in automotive production line coating.

The aqueous multi-component coating compositions, characterized by initial separate storage of the components, may be comprised of one of a variety of systems including: (a) at least one aqueous component and at least one non-aqueous component, (b) at least two aqueous components and without non-aqueous components, or (c) at least two non-aqueous components, water and without aqueous components, however, system (a) is preferred. During the preparation of the aqueous multi-component coating composition in cases (a) and (b), water may be added if desired, for example, in order to obtain a particular solids content or a particular viscosity. However, in cases (a) and (b), the added water should not be regarded as one of the components of the aqueous multi-component coating composition. In all three cases (a), (b) and (c), the added water should not be confused with an aqueous component.

In the aqueous multi-component coating compositions comprising the components described by (a) and (b), the aqueous components may be water-soluble and/or externally dispersed by means of emulsifiers and/or self-dispersing as a result of an appropriate hydrophilic group content. Examples of such hydrophilic groups include, nonionic hydrophilic groups such as polyoxyalkylene groups (e.g., polyethylene oxide and/or polypropylene oxide groups) or ionic hydrophilic groups, such as, cationic or anionic groups, however, anionic groups are preferred. Examples of cationic groups are quaternary ammonium groups or basic groups, for example, amino groups, neutralized by the addition of acids, such as, formic acid, acetic acid, lactic acid. Examples of anionic groups are acid groups, such as, for example, carboxyl groups that are neutralized by the addition of bases, particularly amines or aminoalcohols.

The aqueous multi-component coating compositions contain binders (e.g., cationically stabilized binders and/or anionically stabilized binders) dissolved in water or in an aqueous dispersion form (dispersed according to the principles cited in the paragraph above). Suitable cationically stabilized binders contain, for example, from 8 to 450 milliequivalents of cationic groups or groups that can be converted to cationic groups per 100 g of solid resin. Suitable anionically stabilized binders contain, for example, from 5 to 400 milliequivalents of anionic groups or groups that can be converted to anionic groups per 100 g of solid resin, for example, corresponding to an acid value originating from carboxyl groups of 5 to 200 mg KOH/g.

The aqueous multi-component coating compositions, in addition to the binders containing reactive groups, may also contain cross-linking agents containing reactive groups that are complementary to the reactive groups of the binders. Examples of combinations of such binder and cross-linking agent components include combinations of epoxy-functional components and components containing primary and/or secondary amino groups, combinations of epoxy-functional components and components containing carboxyl groups, and combinations of hydroxy-functional components and polyisocyanate components. Aqueous two-component polyurethane coating compositions prepared by mixing a hydroxy-functional binder component, preferably, an aqueous, hydroxy-functional binder-containing base component, and a polyisocyanate cross-linking agent component, preferably, a non-aqueous polyisocyanate hardener component, are preferred. Of course, it is purely a matter of definition which of the components in each case is to be regarded as the binder component and which is to be regarded as the cross-linking agent component. Generally, the component with the higher amount is regarded as the binder and the component with the smaller amount is regarded as the cross-linking agent.

Suitable cross-linking components preferably include those that are hydrophobic, however, any conventional cross-linker may be used. The cross-linking component containing free isocyanate groups may be rendered hydrophilic, for example, by incorporation of ionic groups or by incorporation of polyethylene oxide units into the polyisocyanate molecule. However, the polyisocyanate cross-linking agent component is preferably a hydrophobic polyisocyanate cross-linking agent. It is advantageous to use hydrophobic polyisocyanates as the hardener in aqueous two-component polyurethane coating compositions for applications with particularly stringent requirements in terms of the coating to be prepared, for example, in automotive OEM coatings.

The binder solids of the aqueous two-component polyurethane coating compositions have a hydroxyl value in the range of, for example, 10 to 300 mg KOH/g, preferably from 20 to 250 mg KOH/g, and more preferably, from 50 to 200 mg KOH/g. Free polyisocyanate is contained in the aqueous two-component coating compositions in a quantity such that the ratio of the number of free isocyanate groups to the number of hydroxyl groups originating from the binder solids is more than 0.5:1 and less than 5:1, preferably 0.7:1 to 2.5:1 and more preferably, 0.8:1 to 2.0:1. The resin basis of the binders is not, in principle, subject to any restriction. They preferably have a number-average molecular weight (Mn) in the range of 500 to 500,000.

Examples of suitable binders include (meth)acrylic copolymers, polyester resins, urethanized polyesters, polyurethanes, polyureas and/or polyurethane ureas. One binder or a combination of binders may be used. It is also possible to use hybrid binders derived from said classes of binder. These are polymer hybrids, wherein two or more binder types bound by covalent bonds or in the form of interpenetrating resin molecules may be present.

Examples of suitable hydrophobic, free polyisocyanates include any organic di- and/or polyisocyanates with aliphatically, cycloaliphatically, araliphatically and/or aromatically bound isocyanate groups, which are a liquid at ambient temperature or liquefied by the addition of organic solvents or present in dissolved form and generally have a viscosity in the range of 0.5 to 2000 mPa.s, preferably, in the range of 1 to 1000 mPa.s, and more preferably, less than 200 mpa.s at 23° C. Examples of preferred polyisocyanates include nonane triisocyanate and diisocyanates, such as, hexamethylene diisocyanate, tetramethylxylylene diisocyanate, isophorone diisocyanate, dicyclohexylmethane diisocyanate, cyclohexane diisocyanate, and combinations thereof. Hydrophobic, free polyisocyanates may also include those which contain heteroatoms in the radical linking the isocyanate groups. Examples include polyisocyanates containing carbodiimide groups, allophanate groups, isocyanurate groups, urethane groups and/or biuret groups. The polyisocyanates preferably have an isocyanate functionality higher than 2, such as, for example, polyisocyanates of the uretidione or isocyanurate type prepared by di- and/or trimerisation of the above-mentioned diisocyanates. Further examples include polyisocyanates containing biuret groups that are prepared by reaction of the above-mentioned diisocyanates with water, or polyisocyanates containing urethane groups that are prepared by reaction with polyols. Conventional paint polyisocyanates derived from hexamethylene diisocyanate, isophorone diisocyanate and/or dicyclohexylmethane diisocyanate, particularly those derived exclusively from hexamethylene diisocyanate, are highly suitable. The phrase "conventional paint polyisocyanates derived from said diisocyanates" should be taken to mean the known derivatives of said diisocyanates containing biuret, urethane, uretidione and/or isocyanurate groups.

The hydrophobic, free polyisocyanates may be added as such during the preparation of the aqueous coating compositions. It may be advantageous if the hydrophobic free polyisocyanates are pre-diluted with an organic solvent or solvent mixture.

In addition to water and binders and preferably also cross-linking agents, the aqueous multi-component coating compositions may optionally contain reactive thinners, paste resins, organic solvents, color- and/or special effect-imparting pigments, fillers and/or conventional paint additives.

Examples of suitable organic solvents include non-water-miscible or partially and/or completely water-miscible organic solvents in an amount of about 0 to less than 20 wt-%, based on the completely mixed coating composition ready for application. Examples of preferred solvents include monohydric or polyhydric alcohols, for example, propanol, butanol, hexanol; glycol ethers or esters, for example, diethylene glycol dialkylethers, dipropylene glycol dialkylethers, in each case with C1- to C6-alkyl, ethoxypropanol, butylglycol; glycols, for example, propylene glycol and oligomers thereof; glycol ether esters, for example, ethyl glycol acetate, butyl glycol acetate, 3-methoxy-n-butyl acetate, butyl diglycol acetate, methoxypropyl acetate; N-methylpyrrolidone and ketones, such as, methyl ethyl ketone, acetone, cyclohexanone; esters, such as, butyl acetate, isobutyl acetate, amyl acetate; aromatic or aliphatic hydrocarbons, for example toluene, xylene or linear or branched, aliphatic C6- to C12-hydrocarbons.

Examples of suitable color- and/or special effect-imparting pigments, color-imparting absorption pigments and/or fillers include carbon black, titanium dioxide, iron oxide pigments, azo pigments, perylene pigments, phthalocyanine pigments, aluminum pigments, mica pigments, talc, kaoline. The pigments are preferably introduced as a constituent of an aqueous base component into the aqueous multi-component coating compositions.

The conventional paint additives may be present in amounts of, for example, up to 5 wt-%. Suitable paint additives include transparent pigments, neutralizing agents, leveling agents, dyes, light stabilizers, antioxidants, rheology control agents, anti-settling agents, antifoaming agents, adhesion-promoting substances, catalysts, amine salts of organic sulfonic acids and combinations thereof. The additives may be introduced into the aqueous multi-component coating agents by means of each of the components, and in particular, as a constituent of an aqueous base component.

If the aqueous multi-component coating compositions are used, for example, as waterborne base coats for the preparation of color- and/or special effect-imparting coating layers, they preferably have a solids content of 10 wt-% to 50 wt-%, more preferably 15 wt-% to 40 wt-%, with a preferred ratio of pigment to solid resin of 0.03:1 to 2.5:1, and more preferably 0.06:1 to 2:1, in each case based on the solids weight. In the event of use as a waterborne clear coat, the solids content is preferably 40 wt-% to 60 wt-%.

The components are preferably mixed together only shortly before application. This premixing can occur in either a continuous or discontinuous fashion, however with regard to industrial-scale production line coating, continuous premixing is preferred. The premixing may take place in a conventional manner, for example, by means of a multi-component mixing installation, particularly a two-component mixing installation, for example, a conventional static mixer, such as, a Kenics mixer, typically used for automotive production line coating. After premixing, the aqueous multi-component coating compositions are generally obtained in the form of aqueous dispersions, wherein binder and/or hardener form one or more disperse phases in a continuous aqueous phase.

The process according to the invention permits the preparation of optically and technologically high-quality coatings using aqueous multi-component coating compositions while dispensing with the use of elaborate mixing technology during the preparation of the aqueous multi-component coating compositions. Rather, the process utilizes conventional, simple and optionally already existing multi-component mixing installations for the preparation of the aqueous multi-component coating compositions. When the present invention utilizes identical aqueous multi-component coating compositions having identical component ratios as those typically found in the art using jet dispersion, the coating layers resulting from the process of the present invention are of equivalent or superior quality in comparison to the coating layers resulting from prior art processes. For example, where the spray edge of the at least one high-speed rotary atomizer has a circumferential velocity ranging from 10,000 to 25,000 m/min., it provides a coating of superior quality when compared those coating resulting from processes using a circumferential velocity of less than 10,000 m/min.

The embodiments of the present invention are further defined in the following Examples. It should be understood that these Examples, while indicating preferred embodiments and the most preferred embodiments of the present invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions. Thus various modifications of the present invention in addition to those shown and described herein will be apparent to those skilled in the art from the foregoing description. Although the invention has been described with reference to materials and embodiments, it is to be understood that the invention is not limited to the particulars disclosed, and extends to all equivalents within the scope of the claims.

EXAMPLES

The results provided by the Examples were provided through interpretation, wherein the human eye was used to observe the coated surface. The quality of the coated surface was assessed based upon its ability to provide a mirror image of the surrounding environment, wherein the observer compared the degree of disturbances among the mirror images provided by the coated surfaces of the Examples and Comparative Examples.

Comparative Example 1

Using a Kenics mixer, an aqueous two-component polyurethane clear coat was prepared from an aqueous base and a non-aqueous polyisocyanate hardener in the volume ratio 100:45 (Herberts Aqua Clear 2K, base R 40821 and hardener R 40906, in each case from DuPont Performance Coatings GmbH & Co. K G, Wuppertal). The premixed aqueous two-component polyurethane clear coat exiting the Kenics mixer was directly fed to a high-speed rotary atomizer (atomizer: N 16010033 ECO-bell from DÜRR). During application, the spray edge having a diameter of 5.5 cm had a rotational speed of 45,000 min$^{-1}$ referring to a circumferential velocity of 7772 m/min. The clear coat was applied to a test panel that was coated with a flashed-off silver colored waterborne base coat as a wedge to a dry film thickness range from 10 to 60 μm, flashed off for 10 minutes at 40° C. and baked for 20 minutes at 140° C.

The coating obtained was assessed visually in the range from 30 to 40 μm clear coat layer thickness: appearance of top coat: not satisfactory; leveling poor; microstructure.

Comparative Example 2

The same aqueous two-component polyurethane clear coat was prepared as in Comparative Example 1, however a different high-speed rotary atomizer was used, namely the ECO-M-bell from DÜRR. In this Comparative Example the diameter of the spray edge was 6.5 cm, and the rotational speed during application was 45,000 min$^{-1}$, wherein the circumferential velocity was 9185 m/min). Result: appearance of top coat not satisfactory; leveling somewhat better than in comparative example 1; microstructure.

Example 3 (According to the Present Invention)

The same aqueous two-component polyurethane clear coat was prepared and the same high-speed rotary atomizer was used as in comparative example 2. However, in this case the high-speed rotary atomizer was operated having a rotational speed of 70,000 min$^{-1}$ (instead of a rotational speed of 45,000 min$^{-1}$ used in Comparative Example 2). Accordingly, the circumferential velocity of the spray edge was 14,287 m/min. Result: appearance of top coat satisfactory; leveling satisfactory; high gloss.

What is claimed is:

1. A process for the application of an aqueous multi-component coating composition comprising the steps of:
   (a) preparing a premix of an aqueous multi-component coating composition comprising at least two components;
   (b) high-speed rotary atomizing the premixture using at least one high-speed rotary atomizer, each having one spray edge, wherein each spray edge has a circumferential velocity ranging from 10,000 to 25,000 m/min; and
   (c) applying the atomized premixture to a substrate.

2. The process of claim 1, wherein a static mixer prepares the premix in step (a).

3. The process of claim 1, wherein the spray edge has a circumferential velocity in the range of 12,000 to 20,000 m/min.

4. The process of claim 1, wherein the at least two components comprise at least one aqueous component and at least one non-aqueous component.

5. The process of claim 1, wherein the aqueous multi-component coating composition is a two-component coating composition.

6. The process according to claim 5, wherein the two-component coating composition is a two-component polyurethane coating composition prepared from a hydroxy-functional component and a polyisocyanate component.

7. The process of claim 6, wherein the hydroxy-functional component is an aqueous component and wherein the polyisocyanate component is a non-aqueous component.

8. The process of claim 1, wherein the aqueous multi-component coating composition is selected from the group consisting of a color- and/or special effect-imparting coating composition and a transparent clear coat coating composition.

9. The process of claim 1, wherein the substrates are selected from the group consisting of automobile bodies and automobile body parts.

* * * * *